(12) United States Patent
Uchino et al.

(10) Patent No.: US 10,880,777 B2
(45) Date of Patent: Dec. 29, 2020

(54) BASE STATION AND TRANSMISSION CONTROL METHOD

(71) Applicant: NTT DOCOMO, INC., Tokyo (JP)

(72) Inventors: Tooru Uchino, Tokyo (JP); Anil Umesh, Tokyo (JP); Kazuki Takeda, Tokyo (JP); Sadayuki Abeta, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/091,932

(22) PCT Filed: Apr. 6, 2017

(86) PCT No.: PCT/JP2017/014344
§ 371 (c)(1),
(2) Date: Oct. 5, 2018

(87) PCT Pub. No.: WO2017/175823
PCT Pub. Date: Oct. 12, 2017

(65) Prior Publication Data
US 2019/0124553 A1    Apr. 25, 2019

(30) Foreign Application Priority Data
Apr. 8, 2016 (JP) ................... 2016-078505

(51) Int. Cl.
*H04W 72/04* (2009.01)
*H04W 28/02* (2009.01)
(Continued)

(52) U.S. Cl.
CPC ........... *H04W 28/12* (2013.01); *H04W 16/32* (2013.01); *H04W 24/10* (2013.01);
(Continued)

(58) Field of Classification Search
CPC ...... H04B 7/2606; H04W 36/30; H04W 5/14; H04L 5/1469
See application file for complete search history.

(56) References Cited

U.S. PATENT DOCUMENTS

2010/0105404 A1\* 4/2010 Palanki ................. H04L 1/0025
455/450
2012/0176947 A1    7/2012 Xi et al.
(Continued)

FOREIGN PATENT DOCUMENTS

EP    3 101 972 A1    12/2016
JP    2013201547 A    10/2013
(Continued)

OTHER PUBLICATIONS

3GPP TS 36.425 V1.0.0; 3rd Generation Partnership Project; Technical Specification Group Radio Access Network; Evolved Universal Terrestrial Radio Access Network (E-UTRAN); X2 interface user plane protocol (Release 12); Dec. 2012 (15 pages).
(Continued)

*Primary Examiner* — Iqbal Zaidi
(74) *Attorney, Agent, or Firm* — Osha Bergman Watanabe & Burton LLP

(57) ABSTRACT

A technique of promptly implementing appropriate flow control in distributed transmission is provided. An aspect of the present invention relates to a base station serving as a distribution source base station in distributed transmission in which transmission target packets are divided and transmitted from a plurality of base stations to a user equipment, wherein the base station includes a feedback information acquiring unit that acquires radio environment information of a distribution destination base station in the distributed
(Continued)

transmission; and a communication control unit that controls the distributed transmission according to the radio environment information.

8 Claims, 10 Drawing Sheets

(51) Int. Cl.
    *H04W 28/08* (2009.01)
    *H04W 72/08* (2009.01)
    *H04W 28/12* (2009.01)
    *H04W 16/32* (2009.01)
    *H04W 24/10* (2009.01)

(52) U.S. Cl.
    CPC ....... *H04W 28/0231* (2013.01); *H04W 28/08* (2013.01); *H04W 72/04* (2013.01); *H04W 72/08* (2013.01)

(56) References Cited

U.S. PATENT DOCUMENTS

| | | |
|---|---|---|
| 2015/0043477 A1 | 2/2015 | Nagata et al. |
| 2015/0215929 A1 | 7/2015 | Damnjanovic et al. |
| 2015/0312871 A1* | 10/2015 | Tong ................. H04W 56/0045 370/252 |
| 2016/0205579 A1* | 7/2016 | Cheng .................. H04L 69/323 370/252 |
| 2016/0366616 A1 | 12/2016 | Wen et al. |

FOREIGN PATENT DOCUMENTS

| | | |
|---|---|---|
| JP | 2014506437 A | 3/2014 |
| WO | 2015/115573 A1 | 8/2015 |
| WO | 2015121747 A2 | 8/2015 |

OTHER PUBLICATIONS

International Search Report issued for PCT/JP2017/014344, dated May 16, 2017 (5 pages).
Written Opinion issued for PCT/JP2017/014344, dated May 16, 2017 (9 pages).
Extended European Search Report issued in counterpart European Patent Application No. 17779201.7, dated Sep. 11, 2019 (9 pages).
ETRI; "Handling of radio link quality degradation in the SeNB"; 3GPP TSG-RAN WG2 #83bis, R2-133271; Ljubljana, Slovenia; Oct. 7-11, 2013 (5 pages).
Office Action issued in the counterpart European Patent Application No. 17779201.7, dated Oct. 2, 2020 (7 pages).

* cited by examiner

FIG.1
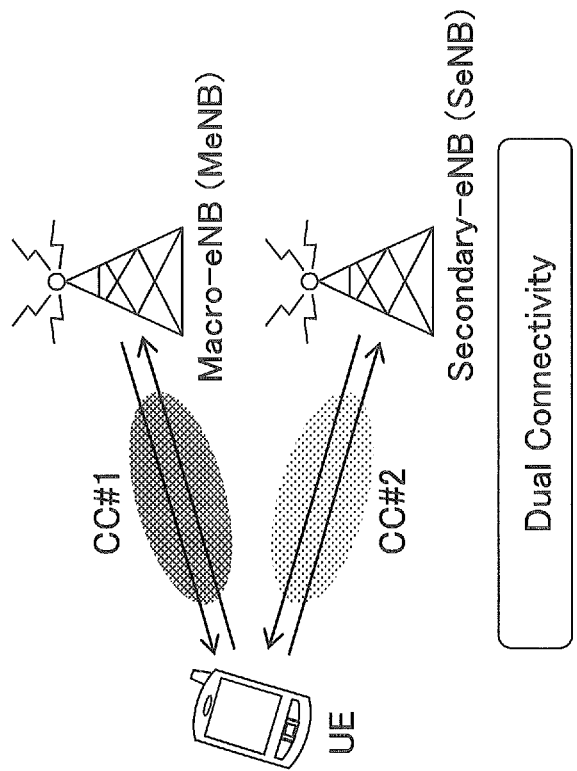
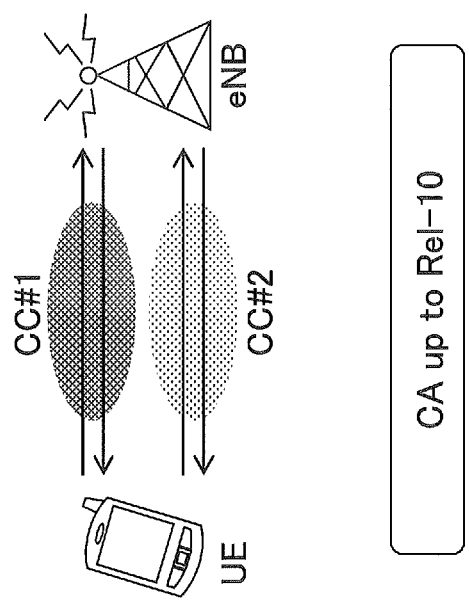

BASE STATION AND TRANSMISSION CONTROL METHOD

TECHNICAL FIELD

The present invention relates to a radio communication system.

BACKGROUND ART

In a Long Term Evolution(LTE)-advanced system established as a next generation communication standard of an LTE system, a carrier aggregation (CA) technique has been introduced in order to achieve throughput higher than in the LTE system while securing backward compatibility with the LTE system. In the carrier aggregation, a component carrier (CC) having a maximum bandwidth of 20 MHz supported by the LTE system is used as a basic component, and attempts to implement wider band communication using a plurality of component carriers simultaneously have been made.

In the carrier aggregation, a user equipment (UE) can communicate with a base station (an evolved NodeB (eNB)) using a plurality of component carriers simultaneously. In the carrier aggregation, a primary cell (PCell) or a master cell group (MCG) which is high in reliability for guaranteeing connectivity and a secondary cell (SCell) or a secondary cell group (SCG) which is additionally set for the user equipment UE during a connection with the primary cell are set.

The primary cell or the master cell group is a cell which is similar to a serving cell in the LTE system and is used for guaranteeing connectivity between a user equipment and a network. On the other hand, the secondary cell or the secondary cell group is a cell or a cell group which is added to the primary cell and set for the user equipment.

In the carrier aggregation of LTE Release 10 (Rel-10) or older, as illustrated in a left diagram of FIG. 1, it is stated that the user equipment performs simultaneous communication using a plurality of component carriers provided from the same base station. On the other hand, in Rel-12, the carrier aggregation of Rel-10 is further expanded, and as illustrated in a right diagram of FIG. 1, dual connectivity (DC) in which the user equipment performs simultaneous communication using a plurality of component carriers provided from a plurality of base stations has been introduced. For example, when a single base station is unable to accommodate all component carriers, the dual connectivity is considered to be effectively used to realize throughput of a similar level to that of Rel-10.

In the dual connectivity, a split bearer is set. When a master base station or a macro base station (MeNB) is used as an anchor node in which a bearer is split, as illustrated in FIG. 2, the master base station divides downlink packets received from a serving gateway (S-GW) into packets to be transmitted to the user equipment via its own cell and packets to be transmitted to the user equipment via a secondary base station (SeNB).

When the split bearer using the master base station as the anchor node is set, as illustrated in FIG. 3, the user equipments includes a physical layer (PHY), a medium access control (MAC) layer (m-MAC), and a radio link control (RLC) layer (m-RLC) for the master base station, a PHY layer, an s-MAC layer, and an s-RLC layer for the secondary base station, and a packet data convergence protocol (PDCP) layer connected to the m-RLC layer and the s-RLC layer. The packets received from the master base station and the packets received from the secondary base station are reordered in the PDCP layer and transmitted to the higher layer. As described above, in the split bearer, the PDCP layer the reception side reorders RLC service data units (SDU) received from both the m-RLC layer and the s-RLC layer.

In order to improve the throughput through distributed transmission of the split bearer or the like, it is necessary to cause an appropriate amount of downlink data to be accumulated in each base station. For example, when the number of downlink data accumulated in each base station is too small, a scheduling opportunity is lost due to data depletion, and it is unable to expect an improvement in the throughput in the base station. On the other hand, when there are too many downlink data accumulated in each base station, the number of packets waiting for reordering on the user equipment side increases, and transmission control protocol retransmission timeout (TCP RTO) occurs.

In the typical split bearer, the master base station undertakes such a flow control function, and appropriately divides data into data to be transmitted from the MCG and data to be transmitted from the SCG based on data rates in the MCG and the SCG. In order to implement the flow control function, in 3GPP, an interface for a flow control mechanism is specified in an X2 interface between the master base station and the secondary base station (3GPP TS 36.425).

According to the flow control mechanism, as illustrated in FIG. 4, in step S11, the master base station transfers downlink data to the secondary base station. In FIG. 4, data transmission from the master base station to the user equipment is not illustrated for sake of simplicity of description. In step S12, the secondary base station transmits the transferred data to the user equipment. In step S13, the secondary base station receives an acknowledgment (ACK) to the downlink data from the user equipment. In step S14, the secondary base station transmits the ACK information to the master base station. Specifically, the secondary base station notifies the master base station of a PDCP sequence number (SN) of the latest PDCP packet data unit (PDU) that has been transmitted in order. In step S15, the master base station determines a transmission completion state of the secondary base station based on a transferred data amount and a received ACK information amount, and decides a data amount to be transferred to the secondary base station based on the transmission completion state. Thereafter, steps S11 to S15 are repeated.

Prior Art Document

Non-Patent Document

Non-Patent Document 1: 3 GPP TS 36.425 V 1.0.0 (2014-12)

SUMMARY OF THE INVENTION

Problem to be Solved by the Invention

According to such a flow control mechanism, the master base station can transfer a certain amount of data to the secondary base station and determine an appropriate transfer data amount after receiving feedback information from the secondary base station. In other words, the flow control mechanism of the related art distributes data based on the ACK information from the secondary base station. For this reason, the master base station needs a certain amount of time to determine an appropriate data transfer amount, that is, a data division ratio, it takes time for convergence of the flow control, and thus it is undesirable from a point of view of performance.

In view or the above-described problem, an object of the present invention is to provide a technique for promptly implementing appropriate flow control in distributed transmission.

Means for Solving the Problem

In light of the above problems, one aspect of the present invention provides a base station serving as a distribution source base station in distributed transmission in which transmission target packets are divided and transmitted from a plurality of base stations to a user equipment, including: a feedback information acquiring unit that acquires radio environment information of a distribution destination base station in the distributed transmission; and a communication control unit that controls the distributed transmission according to the radio environment information.

Another aspect of the present invention provides A user equipment, including: a measuring unit that measures communication quality of radio communication with a base station; a reporting unit that reports the measured communication quality to the base station, wherein the measuring unit measures the communication quality of the radio communication with the base station that transmits transmission target packets to the user equipment in distributed transmission, and the reporting unit reports a communication quality of a distribution destination base station in the distributed transmission to a distribution source base station.

Yet another aspect of the present invention provides a transmission control method performed by a distribution source base station in distributed transmission in which transmission target packets are divided and transmitted from a plurality of base stations to a user equipment, including: a step of acquiring radio environment information of a distribution destination base station in the distributed transmission; and a step of controlling the distributed transmission according to the radio environment information.

Advantage of the Invention

According to the present invention, it is possible to promptly implement appropriate flow control in distributed transmission.

BRIEF DESCRIPTION OF DRAWINGS

FIG. 1 is a schematic diagram illustrating carrier aggregation;

EMBODIMENTS OF THE INVENTION

Hereinafter, an exemplary embodiment of the present invention is described based on the appended drawings.

In the following embodiment, a user equipment and a base station that support distributed transmission such as dual connectivity are disclosed. An overview of an embodiment to be described below is as follows: in distributed transmission, a distribution source base station acquires radio environment information such as quality information of radio communication between a distribution destination base station and a user equipment, and controls distributed transmission, for example, such that a data transfer amount to the distribution destination base station based on the acquired radio environment information is adjusted. Here, a notification of the radio environment information is given from the distribution destination base station or the user equipment to the distribution source base station. Further, in the distributed transmission, the user equipment measures the quality information of the radio communication between the distribution destination base station and the user equipment, and transmits the measured quality information to the distribution source base station.

As a result, the distribution source base station can control the data transfer amount to the distribution destination base station more promptly than in the scheme of the related art in which the data transfer amount is adjusted based on the transmission completion state to the user equipment in the distribution destination base station. The following embodiments are described in connection with the dual connectivity, but the present invention is not limited thereto and can be applied to any distributed transmission scheme in which transmission target packets are divided and transmitted from a plurality of base stations to a user equipment.

Figure 2:
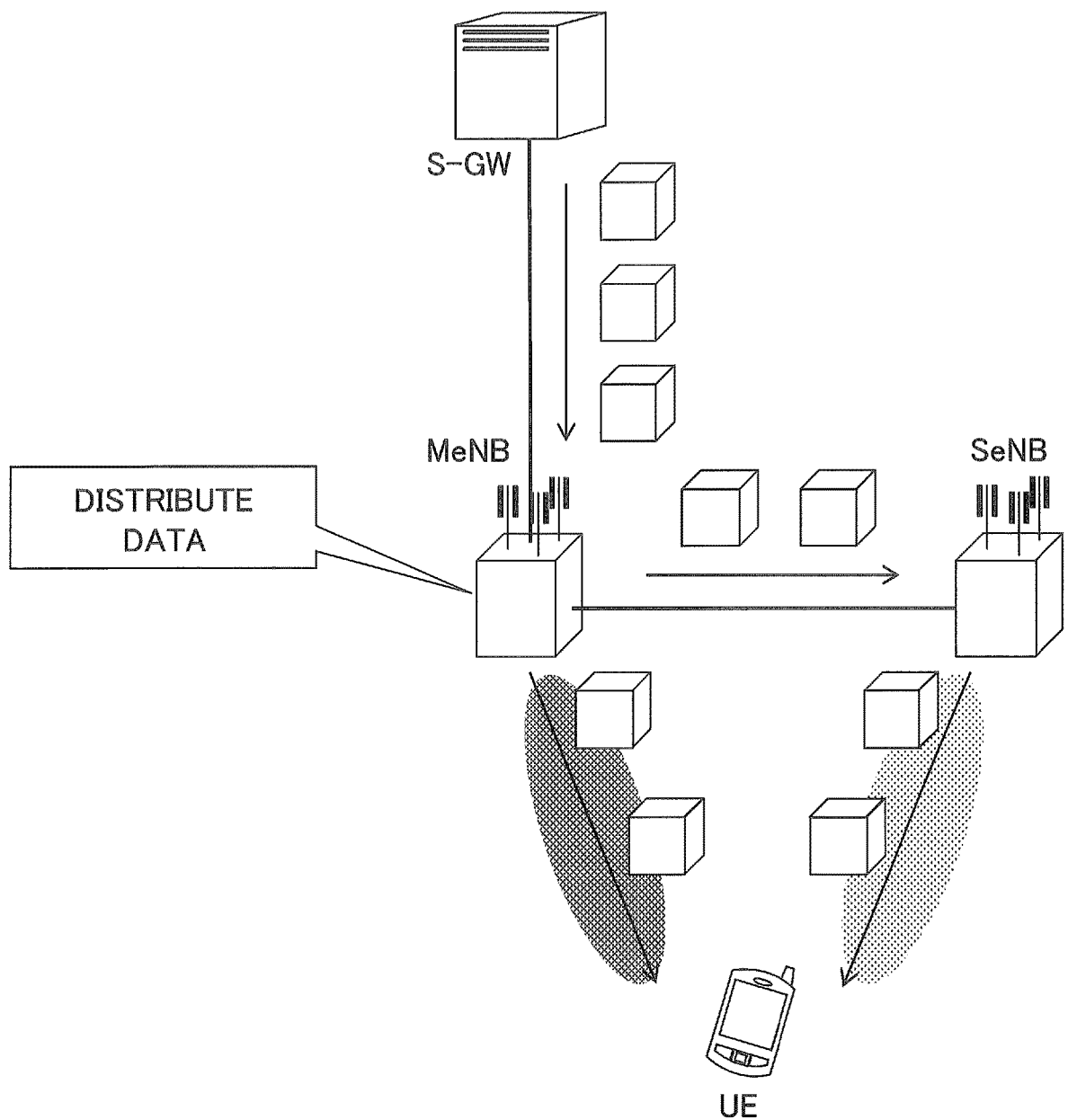
FIG. 2 is a schematic diagram illustrating a split bearer using a macro base station as an anchor node.
Figure 3:
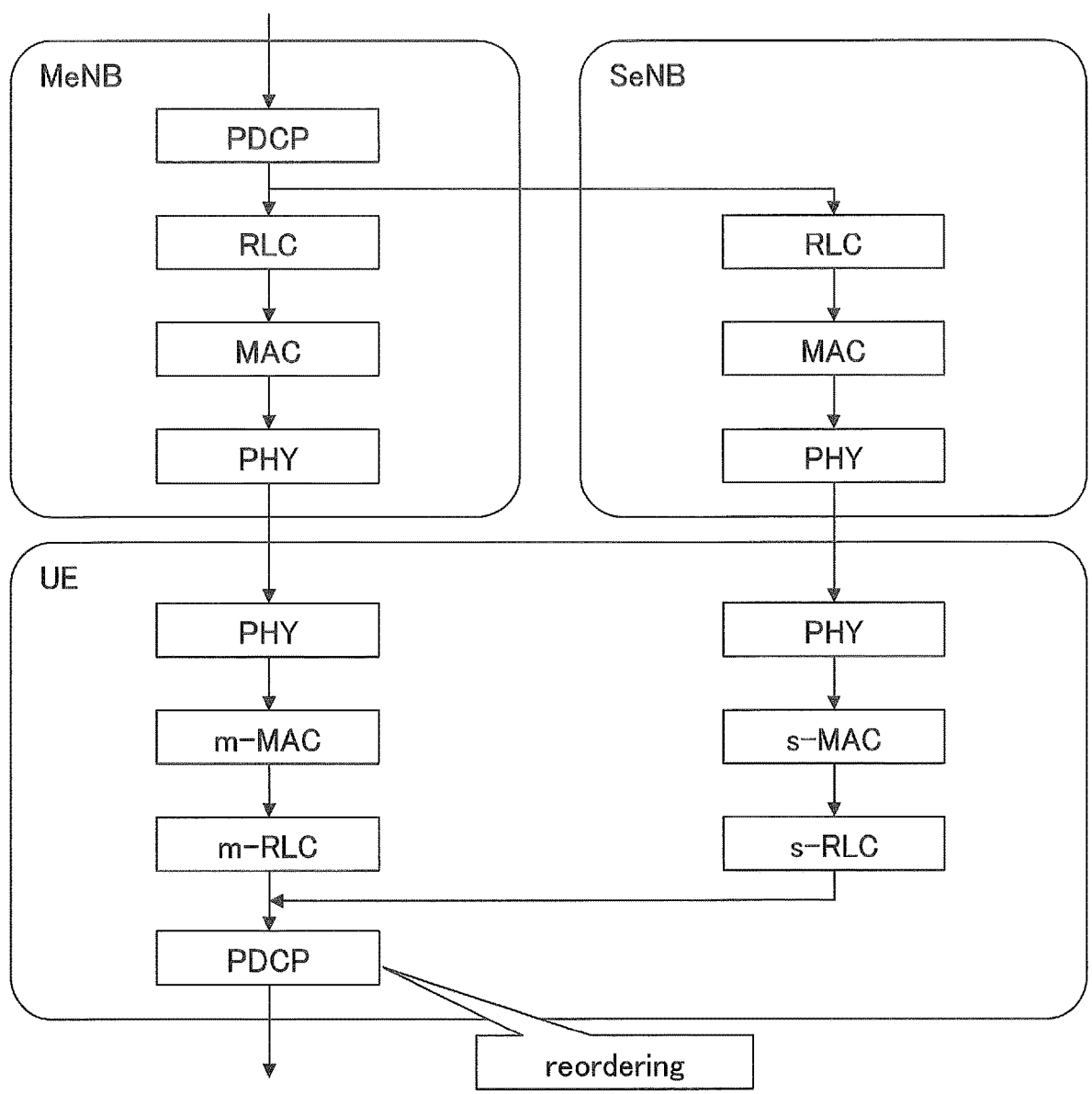
FIG. 3 is a schematic diagram illustrating a layer configuration for downlink communication when a split bearer is set.
Figure 4:
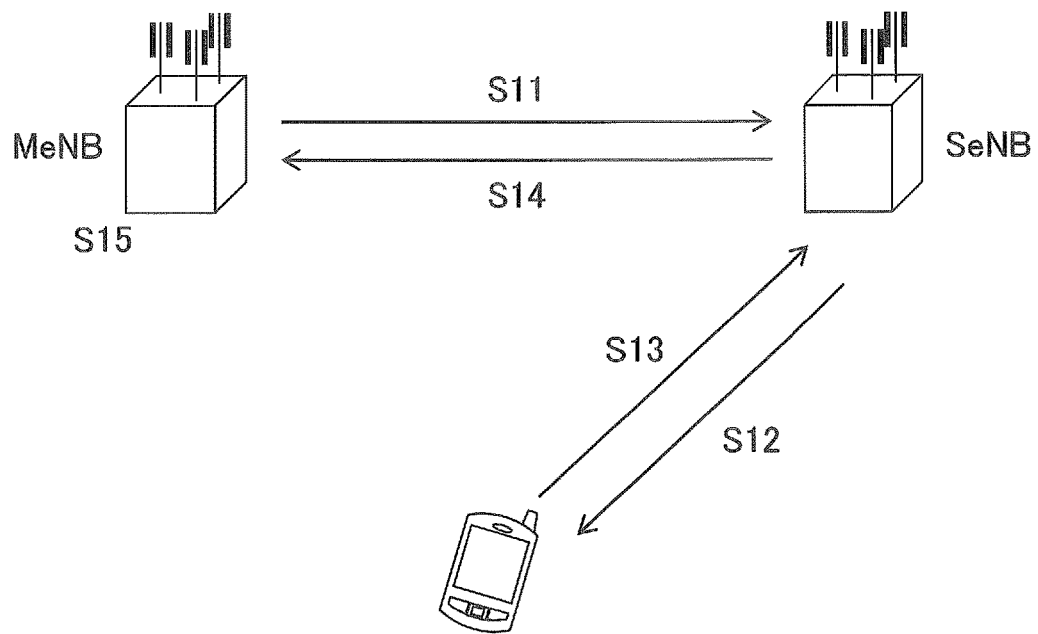
FIG. 4 is a schematic diagram illustrating a flow control of a related art in a split bearer.
Figure 5:
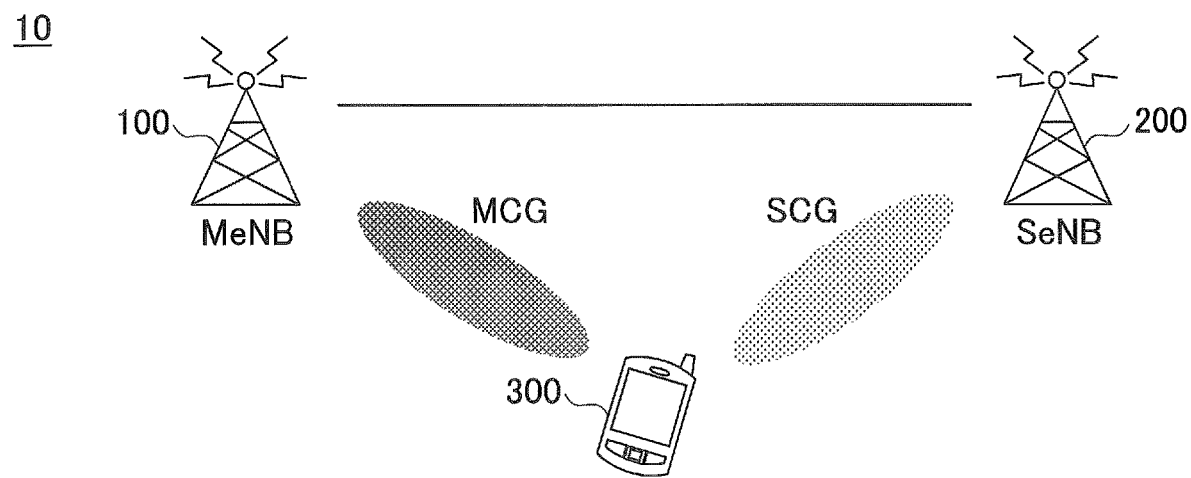
FIG. 5 is a schematic diagram illustrating a radio communication system according to an embodiment of the present invention.

A radio communication system according to an embodiment of the present invention is described with reference to FIG. 5. FIG. 5 is a schematic diagram illustrating a radio communication system according to an embodiment of the present invention.

As illustrated in FIG. 5, a radio communication system 10 includes a master base station 100, a secondary base station 200, and a user equipment 300. For example, the radio communication system 10 may be a radio communication system conforming to 3rd Generation Partnership Project (3GPP) standard such as an LTE-advanced system or a 5G system. The radio communication system 10 supports the dual connectivity in which the user equipment 300 performs simultaneous communication using the master cell group (MCG) and the secondary cell group (SCG) provided from the master base station (MeNB) 100 and the secondary base station (SeNB) 200. However, the radio communication system 10 according to the present invention is not limited thereto and can be applied to any radio communication system supporting distributed transmission in which transmitting transmission target packets are divided and transmitted from a plurality of radio stations to a user equipment. Only two base stations 100 and 200 are illustrated in the illustrated embodiment, but in general, a plurality of base stations 100 and 200 are arranged to cover a service area of the radio communication system 10.

Each of the base stations 100 and 200 is wirelessly connected with the user equipment 300 and transmit downlink (DL) packets received from a network device such as a higher station and/or a server which is communicatively connected on a core network (not illustrated) to the user equipment 300 and transmits uplink (UL) packets received from the user equipment 300 to the network device. In the illustrated embodiment, the base station 100 functions as the master base station (MeNB) or the primary base station, and the base station 200 functions as the secondary base station (SeNB). In the typical dual connectivity, the master base station 100 functions as an anchor base station that controls the simultaneous communication including the flow control in the dual connectivity between the user equipment 300 and the base stations 100 and 200, and controls communication with a higher core network (not illustrated). However, the present invention is not limited thereto, and the secondary base station may function as an anchor base station and realize the flow control in the distributed transmission to be described later.

Figure 6:
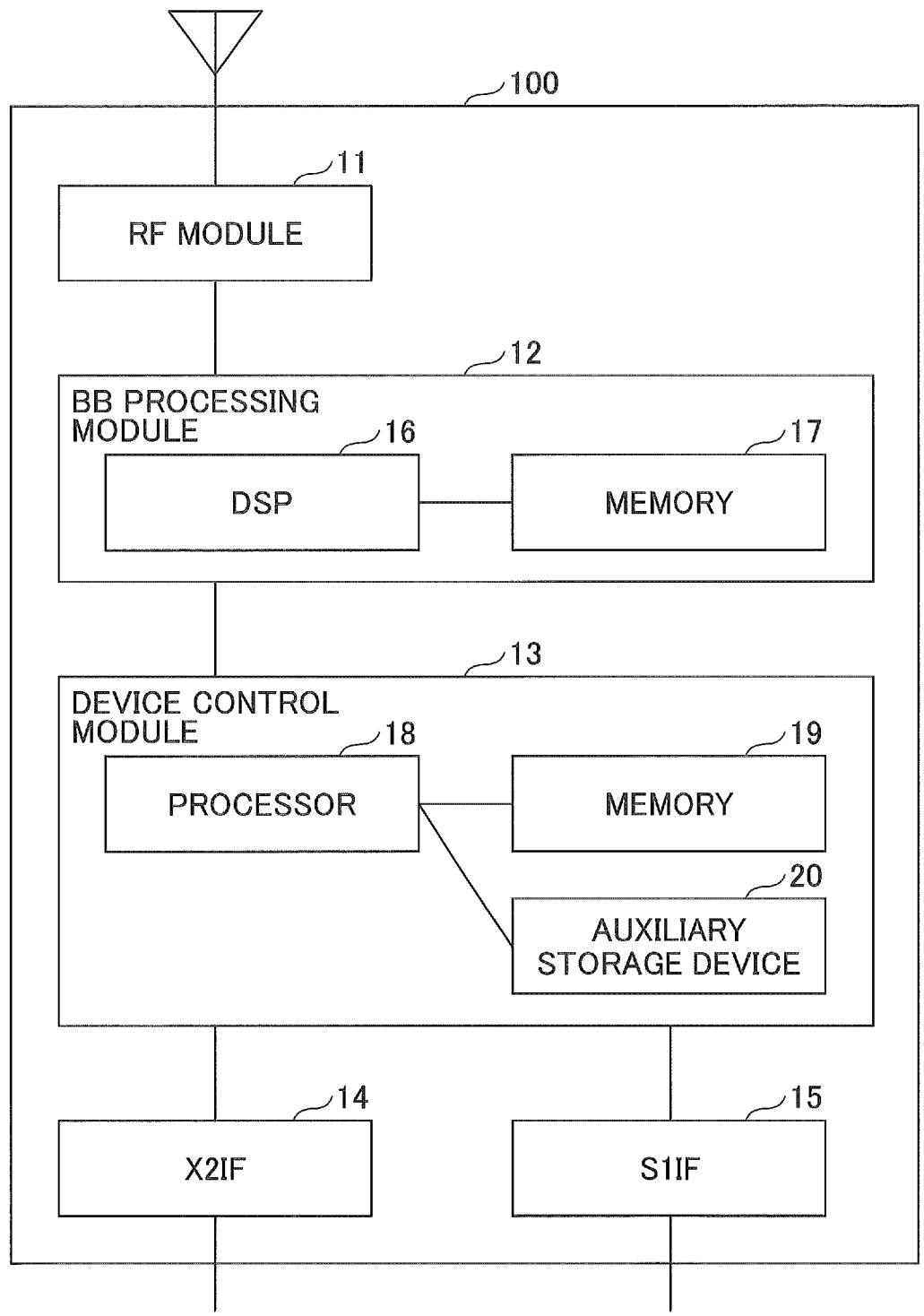
FIG. 6 is a block diagram illustrating a hardware configuration of a base station according to an embodiment of the present invention.

As illustrated in FIG. 6, the base station 100 has an RF module 11, a baseband (BB) processing module 12, a device control module 13, an X 2 interface (IF) 14, and an S1 interface (IF) 15.

The RF module 11 implements an RF function, and performs digital-to-analog (D/A) conversion, modulation, frequency transform, power amplification, and the like on a digital baseband signal received from the baseband processing module 12 and generates a radio signal to be transmitted through an antenna. Further, the RF module 11 performs frequency transform, analog-to-digital (A/D) conversion, demodulation, and the like on a received radio signal, generates a digital baseband signal, and transfers the digital baseband signal to the baseband processing module 12.

The baseband processing module 12 converts the digital baseband signal transmitted or received to or from the RF module 11 into a signal transmitted or received to or from the device control module 13 and vice versa. The baseband processing module 12 includes a digital signal processor (DSP) 16 that performs signal processing including the above conversion and a memory 17 for the DSP 16.

The device control module 13 performs various kinds of processes in the base station 100 such as generation, extraction, processing, and the like of various kinds of information to be described later. The device control module 13 includes a processor 18 that performs processing in the device control module 13, a memory 19 for the processor 18, and an auxiliary storage device 20 that stores various kinds of programs and data for an operation of the base station 100.

The X 2 interface 14 is an interface for establishing a communication connection with another base station 200 and connected to a physical line connecting the base station 100 with the base station 200.

The S1 interface 15 is an interface for a connection with the core network and is connected to a physical line connecting the base station 100 with the core network.

The base station 200 may be configured with the same hardware configuration as that of the base station 100. However, the base stations 100 and 200 are not limited to the above-described hardware configuration and may have any other appropriate hardware configuration.

The user equipment 300 supports the dual connectivity that enables the user equipment 300 to simultaneously communicates with a plurality of base stations 100 and 200. The user equipment 300 performs transmission and reception of radio signals with the base stations 100 and 200 via cells provided by the base stations 100 and 200. Typically, the user equipment 300 may be any appropriate information processing device with a radio communication function such as smartphones, mobile phones, tablets, mobile routers, wearable terminals, or the like.

Figure 7:
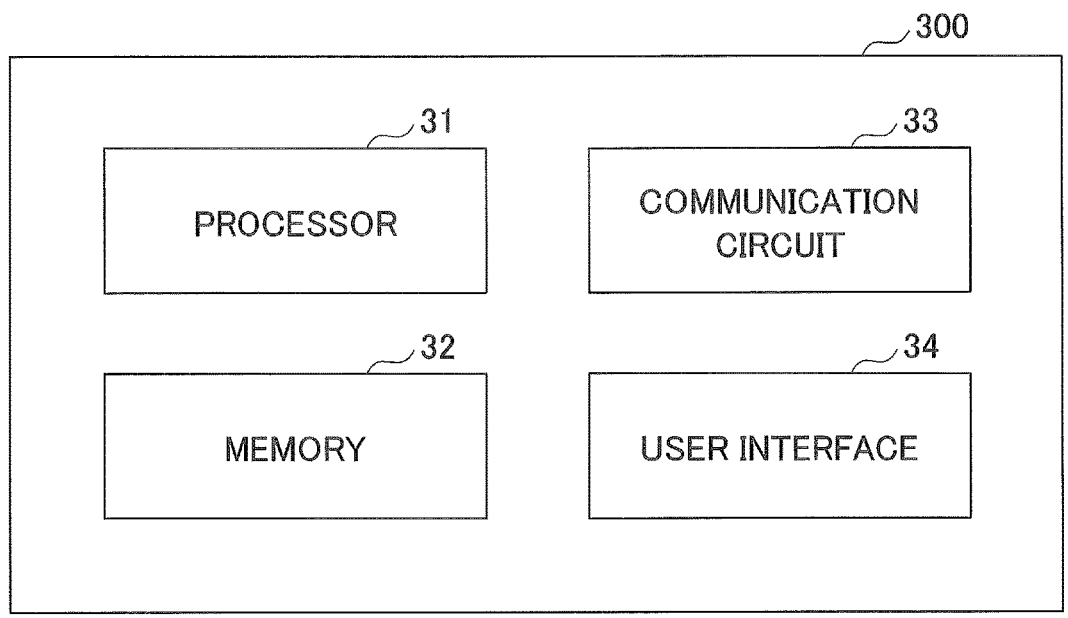
FIG. 7 is a block diagram illustrating a hardware configuration of a user equipment according to an embodiment of the present invention.

As illustrated in FIG. 7, the user equipment 300 is configured with hardware resources such as a processor 31 functioning as a central processing unit (CPU), a memory 32 such as a random access memory (RAM) and/or a flash memory, a communication circuit 33 that performs transmission and reception of radio signals with the base stations 100 and 200, and a user interface 34 such as an input/output device and/or a peripheral device. For example, functions and processes of the user equipment 300 to be described below may be implemented by processing or executing the data and/or the program stored in the memory 32 through the processor 31. However, the user equipment 300 is not limited to the above-described hardware configuration and may be configured with a circuit or the like that implements one or more of processes to be described later.

Figure 9:
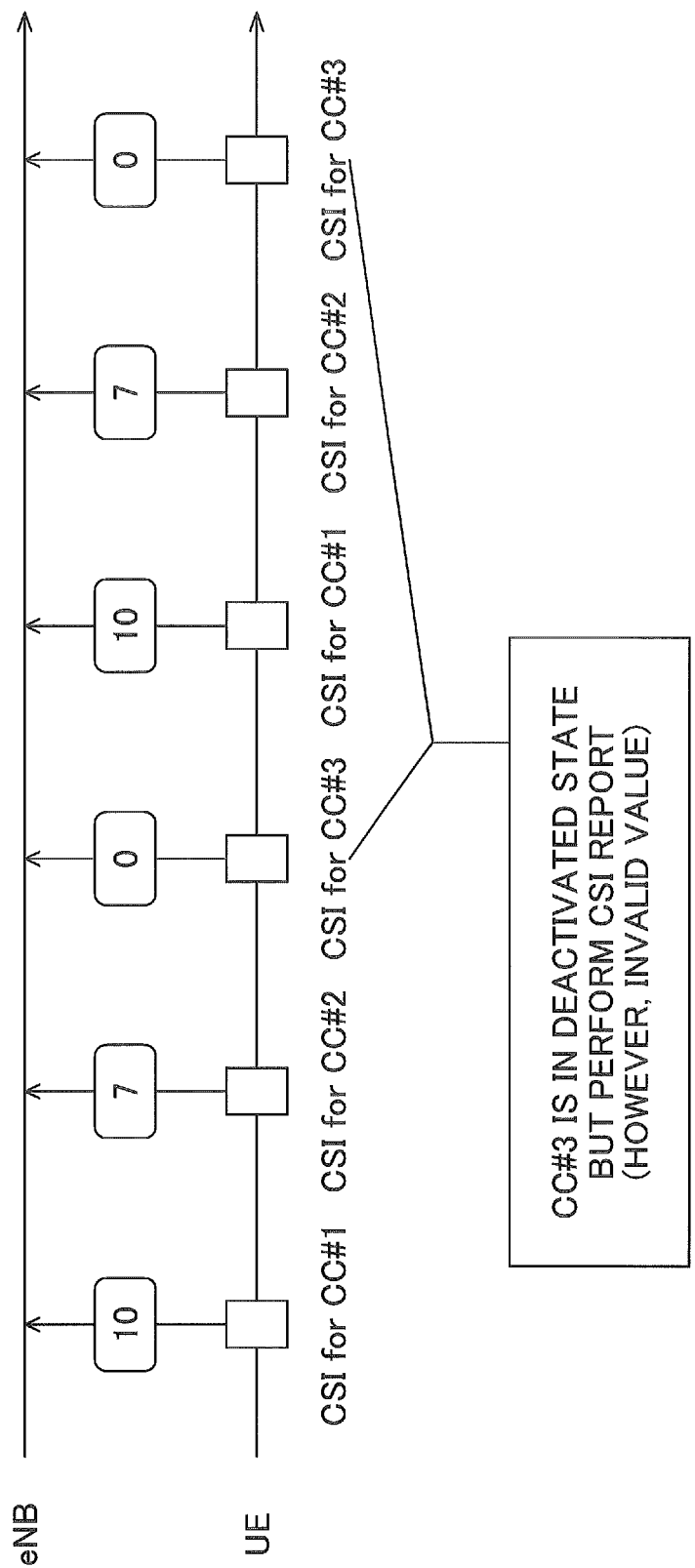
FIG. 9 is a diagram illustrating a quality report process from a user equipment according to an embodiment of the present invention.
Figure 10:
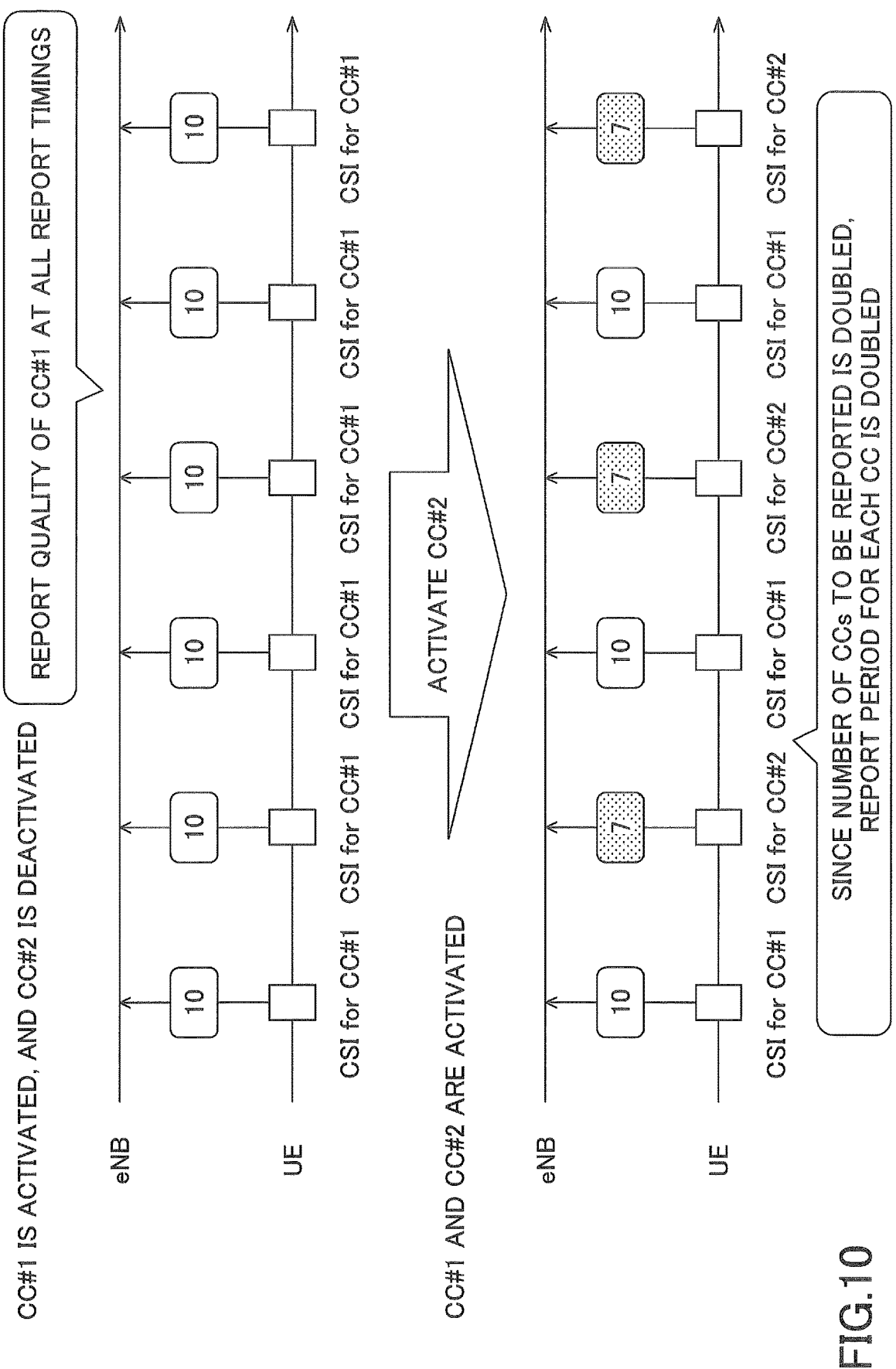
FIG. 10 is a diagram illustrating a quality report process from a user equipment according to an embodiment of the present invention.

Next, the anchor base station in the dual connectivity according to an embodiment of the present invention is described with reference to FIGS. 8 to 10. In the following embodiment, the master base station 100 and the secondary base station 200 perform downlink transmission according to the dual connectivity with the user equipment 300 in collaboration with each other. For the sake of convenience of description, the master base station 100 functions as an anchor base station that performs the flow control in the dual connectivity, and the secondary base station 200 functions as a non-anchor base station that receives data transferred from the anchor base station. However, the present invention is not limited thereto, and the secondary base station 200 may function as the anchor base station, and the master base station 100 may function as the non-anchor base station. Further, the present invention is not limited to the dual connectivity and can be applied to any distributed transmission in which transmission target packets are divided and transmitted from a plurality of base stations 100 and 200 to the user equipment 300. In this case, a base station that divides the transmission target packets and transfers the packets to another the base station is a distribution source base station, and a base station that receives the packets transferred from the distribution source base station is the distribution destination base station.

Figure 8:
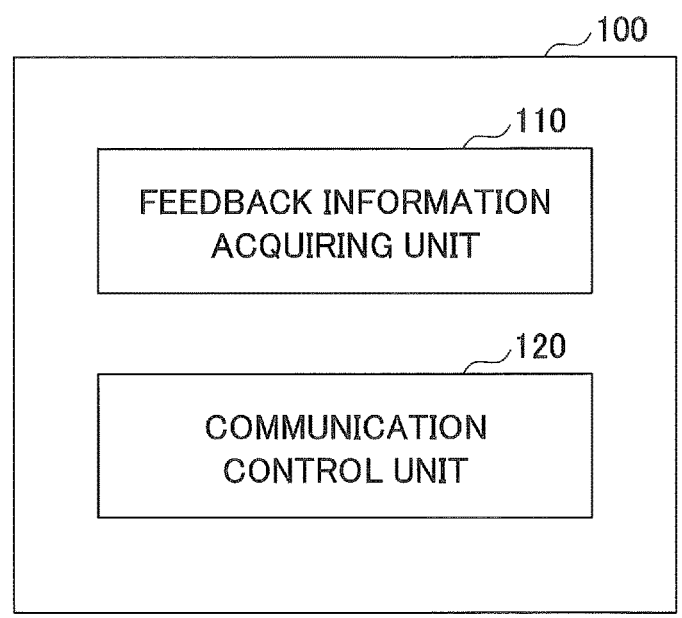
FIG. 8 is a block diagram illustrating a functional configuration of an anchor base station according to an embodiment of the present invention.

FIG. 8 is a block diagram illustrating the functional configuration of an anchor base station according to an embodiment of the present invention. In the present embodiment, the master base station 100 functions as an anchor base station or a distribution source base station that performs flow control in the dual connectivity, and the secondary base station 200 functions as a non-anchor base that receives a packet transferred from the master base station 100 Station or distribution destination base station. As illustrated in FIG. 8, the master base station 100 includes a feedback information acquiring unit 110 and a communication control unit 120.

The feedback information acquiring unit 110 acquires radio environment information of the secondary base station 200. Specifically, the feedback information acquiring unit 110 transmits uplink control information (UCI) indicating quality information (channel state information (CSI)) of radio communication between the secondary base station 200 and the user equipment 300 in the dual connectivity as the radio environment information. As described below in detail, the radio environment information may be acquired from the secondary base station 200 or may be acquired from the user equipment 300.

The communication control unit 120 controls the distributed transmission according to the radio environment information. Specifically, the communication control unit 120 controls a data amount to be transferred to the secondary base station 200 according to the radio environment information such as the quality information of the radio communication between the secondary base station 200 and the user equipment 300. For example, when the radio communication between the secondary base station 200 and the user equipment 300 is better than the radio communication between the master base station 100 and the user equipment 300, the communication control unit 120 may increases the data amount to be transferred to the secondary base station 200. On the other hand, when the radio communication between the secondary base station 200 and the user equipment 300 is not better than the radio communication between the master base station 100 and the user equipment 300, the communication control unit 120 may reduce the data amount to be transferred to the secondary base station 200.

As described above, unlike the conventional scheme, the master base station 100 does not wait for the report of the transmission completion state to the user equipment in the secondary base station 200 and thus can implement the flow control in the dual connectivity appropriately and promptly using the radio environment information which can be acquired more promptly than the transmission environment state.

In an embodiment, the communication control unit 120 may adjust the division ratio of the transmission target packets between the master base station 100 and the secondary base station 200 according to the acquired radio environment information. In other words, the communication control unit 120 controls the data amount to be transferred to the secondary base station 200 by adjusting the division ratio of the transmission target packets between the base stations 100 and 200. For example, when the radio communication between the secondary base station 200 and the user equipment 300 is better than the radio communication between the master base station 100 and the user equipment 300, the communication control unit 120 may adjust the division ratio so that a weighting of the secondary base station 200 is increased. On the other hand, when the radio communication between the secondary base station 200 and the user equipment 300 is not better than the radio communication between the master base station 100 and the user equipment 300, the communication control unit 120 may adjust the division ratio so that the weighting of the secondary base station 200 is decreased.

As described above, the radio environment information may be acquired from the secondary base station 200 or may be acquired from the user equipment 300. In the former case, the feedback information acquiring unit 110 receives the quality information of the radio communication between the secondary base station 200 and the user equipment 300 from the secondary base station 200. On the other hand, in the latter case, the feedback information acquiring unit 110 receives the quality information of the radio communication between the secondary base station 200 and the user equipment 300 from the user equipment 300.

First, the case is described in which the radio environment information is acquired from the secondary base station 200. In this case, the secondary base station 200 transmits the quality information measured for the user equipment 300 to which the dual connectivity is set to the master base station 100. For example, the quality information may be the uplink control information (UCI) such as the CSI of each secondary cell, and the CSI may include a channel quality indicator (CQI), a rank indicator (RI), a precoding matrix indicator (PMI), a precoding type indicator (PTI), or the like. Further, the quality information may be a reception quality of a sounding reference signal (SRS), a signal-to-interference-noise ratio (SINR), a block error rate (BLER), or the like.

The secondary base station 200 may give a notification of an identifier of the user equipment 300, one of downlink and uplink with which the quality information is associated, cell information, a measurement time, or the like to the master base station 100 together with the quality information. Here, the identifier of the user equipment 300 may be either a cell-radio network temporary identifier (C-RNTI) in the master base station 100 or a C-RNTI in the secondary base station 200. Further, the cell information may be a frequency, a physical cell identity (PCI), a cell index, a SCell index, a measurement band, a measurement frequency, or the like, and the measurement time may be a hyper-system frame number (H-SFN), an SFN, or a subframe number.

Further, the notification of the quality information may be periodically given from the secondary base station 200 or may be given in response to a request (polling) from the master base station 100. Further, the feedback information acquiring unit 110 may give a notification of a transmission start and/or stop of the quality information to the secondary base station 200.

Further, when it is unable to acquire a valid measurement result of the communication quality in the secondary base station 200, the secondary base station 200 may not give the notification of the quality information or may give a notification indicating "there is no result" to the base station 100. Further, the measurement value of the quality information may be an instantaneous value or an average value in a certain period of time. Further, only when there is a difference of a predetermined value or more between an acquired measurement value and a reported previous measurement value, the secondary base station 200 may notify the master base station 100 of the acquired measurement value or the difference.

Further, in the dual connectivity of the related art, since signaling radio bearer (SRB) data indicating control information is transmitted and received between the master base station 100 and the user equipment 300, a measurement report of the user equipment 300 is transmitted from the user equipment 300 to the master base station 100. However, when transmission and reception of the SRB data are supported even between the secondary base station 200 and the user equipment 300, the secondary base station 200 may transfer the measurement report received from the user equipment 300 to the master base station 100.

Alternatively, in place of or in addition to the quality information, the secondary base station 200 may notify the master base station 100 of a transport block size (TBS) that can be allocated to the user equipment 300 or transmit information necessary for calculating the TBS (for example, the number of allocable resource blocks) as the radio environment information.

The secondary base station 200 may notify the master base station 100 of congestion information of a component carrier (CC) or a cell provided by the secondary base station 200 together with the quality information.

Further, a CC or a cell serving as a report target may be limited. In other words, the feedback information acquiring unit 110 may decide a CC or a cell serving as the report target and notify the secondary base station 200 of the decided CC or cell. Alternatively, the secondary base station 200 may decide a CC or a cell serving as the report target and report the quality information of the CC or the cell to the master base station 100.

Furthermore, in the current dual connectivity, the number of base stations to which the user equipment 300 can be connected is specified as two. However, when the dual connectivity with three or more base stations is supported, a notification of a base station serving as the anchor base station that performs the flow control may be given from a network. Thus, the non-anchor base station can notify the designated anchor base station of the quality information.

Next, the case is described where the radio environment information is acquired from the user equipment 300. In this case, the user equipment 300 transmits the uplink control information (UCI) indicating the CSI of the CC or cell provided by the secondary base station 200 or the like to the master base station 100. At this time, the feedback information acquiring unit 110 may secure resources for reporting the uplink control information of the CC or cell provided by the secondary base station 200 (referred to as an "inter-CG UCI") to the user equipment 300 and notify the user equipment 300 of the resources. The user equipment 300 notifies the master base station 100 of the inter-CG UCI using the reported resources.

Here, in the carrier aggregation, the CSI is not reported to a deactivated secondary cell. Therefore, when the master base station 100 does not detect the activated or deactivated state of the secondary cell, the feedback information acquiring unit 110 does not know a timing at which the CSI for the secondary cell is reported from the user equipment 300 and is unable to perform rate matching appropriately or needs to consistently perform blind decoding on all patterns. In order to deal with the problem in that the CSI is not reported to the deactivated secondary cell, the following two solutions are considered.

As a first solution, the user equipment 300 may report the quality information so that the master base station 100 and the user equipment 300 have the same secondary cell state recognition. Specifically, as illustrated in FIG. 9, the user equipment 300 may report quality information of a predetermined quality value for the secondary cell in the deactive state to the master base station 100. In other words, when the secondary cell is in the deactive state, the feedback information acquiring unit 110 receives a predetermined quality value from the user equipment 300. The predetermined quality value may be a predetermined value ("0" in the illustrated example) or an invalid value (out-of-range) or the like. Upon receiving the predetermined quality value, the feedback information acquiring unit 110 can determine that a corresponding secondary cell is in the deactive state. Furthermore, the problem of rate matching occurring because the quality information of the secondary cell in the deactive state is not transmitted can also be prevented.

As a second solution, the user equipment 300 may prepare resource pooling for reporting the quality information of the CC or the secondary cell in the active state and adjust a report frequency of the quality information according to the number of CCs or secondary cells serving as the report target. Specifically, as illustrated in FIG. 10, for only the secondary cell in the active state, the user equipment 300 may report the quality information of the secondary cell to the master base station 100. In the illustrated example, at an initial stage, since only a CC #1 is in the active state, the user equipment 300 reports only the quality information of the CC #1 to the master base station 100 at regular time intervals. Thereafter, when a CC #2 in the deactive state transitions to the active state, the user equipment 300 reports two pieces of quality information of the CC #1 and the CC #2 at the same time intervals. In other words, since the number of CCs serving as the report target is doubled, a reporting period for each CC is also doubled. As a result, the feedback information acquiring unit 110 receives the quality information of the cell of the secondary base station 200 from the user equipment 300 at the report frequencies corresponding to the number of cells serving as the report target.

Further, the CC or cell that is the report target of the inter-CG UCI may be limited to a specific CC or cell. The specific CC or cell may be a cell in which a primary cell or a secondary cell is set or may be designated from a network. Further, whether or not it is necessary to transmit the inter-CG UCI may be dynamically indicated from a network. The indication may be transmitted through, for example, a physical control channel and/or a MAC control signal.

Further, when transmission power necessary for the user equipment 300 exceeds maximum transmission power, for the inter-CG UCI (the uplink control information of the secondary cell) and the intra-CG UCI (the uplink control information of the primary cell), the transmission power of the user equipment 300 may be distributed based on a predetermined priority. The predetermined priority may be classified into (1) intra-CG UCI>inter-CG UCI, (2) intra-CG UCI=inter-CG UCI, or (3) intra-CG UCI<inter-CG UCI. According to the case (1), link adaptation within the cell group can be performed appropriately. According to the case (2), when one of the UCIs is received by the feedback information acquiring unit 110, the communication control unit 120 can distribute the data to the corresponding cell. According to the case (3), the user equipment 300 can reliably receive the CSI through the master base station 100 that guarantees connectivity.

Further, the inter-CG UCI may be multiplexed with the intra-CG UCI or may be transmitted independently. Whether the inter-CG UCI is multiplexed or independently transmitted may be decided according to a capability of the user equipment 300 or a setting from the network. Further, the inter-CG UCI may be multiplexed with uplink data information (PUSCH) with in the cell group serving as the report target. A notification of capability information indicating whether or not the inter-CG UCI can be transmitted may be given from the user equipment 300 to the master base station 100. For example, the notification of the capability information may be explicitly given in units of user equipments or units of band combinations or may be given implicitly or indirectly in association with a specific radio access technology (RAT), a frequency, or the like.

Figure 11:
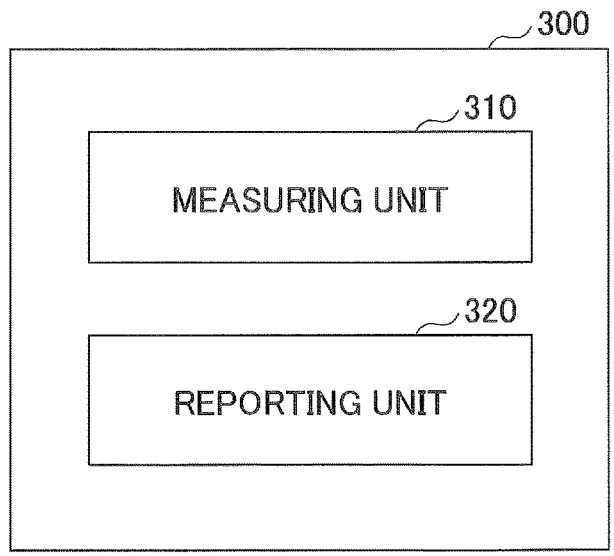
FIG. 11 is a block diagram illustrating a functional configuration of a user equipment according to an embodiment of the present invention.

Next, the user equipment according to the embodiment of the present invention is described with reference to FIG. 11. FIG. 11 is a block diagram illustrating a functional configuration of the user equipment according to the embodiment of the present invention. The user equipment 300 according to the present embodiment performs communication with the master base station 100 functioning as an anchor base station and the secondary base station 200 functioning as the non-anchor base station through the dual connectivity.

As illustrated in FIG. 11, the user equipment 300 has a measuring unit 310 and a reporting unit 320.

The measuring unit 310 measures the communication quality of the radio communication with the base stations 100 and 200. Specifically, the measuring unit 310 measures reference signals such as the SRSs transmitted from the cells provided by the master base station 100 and the secondary base station 200, and decides indicators such as the CQI, the RI, the PMI, and the PTI. Further, the measuring unit 310 decides the measurement values such as the reception quality of the SRS, the SINR, and the BLER based on the measurement result of the reference signal. For example, the measuring unit 310 may measure the communication quality in response to a measurement instruction given from the master base station 100 or the secondary base station 200 or periodically.

The reporting unit 320 reports the measured communication quality to the base stations 100 and 200. Specifically, the reporting unit 320 may transmit the CSI indicating the communication quality measured through the measuring unit 310 to the master base station 100 or the secondary base station 200 through the uplink control information (UCI). For example, a notification of the resources used for transmitting the uplink control information may be given from the master base station 100 or the secondary base station 200.

In the dual connectivity according to the present embodiment, the measuring unit 310 measures the communication quality of the radio communication with the master base station 100 and/or the secondary base station 200 that transmits the transmission target packets to the user equipment 300, and the reporting unit 320 reports the communication quality of the secondary base station 200 to the master base station 100. Specifically, the reporting unit 320 transmits the CSI indicating the communication quality of the secondary cell provided by the secondary base station 200 to the master base station 100 through the uplink control information. For example, the reporting unit 320 may transmit the uplink control information including the CSI to the master base station 100 using the resources of which the master base station 100 notifies.

In order to deal with the problem in that the CSI is not reported to the deactivated secondary cell, the reporting unit 320 may report the quality information so that the master base station 100 and the user equipment 300 have the same secondary cell state recognition. Specifically, as illustrated in FIG. 9, the reporting unit 320 may report quality information of a predetermined quality value for the secondary cell in the deactive state to the master base station 100. The predetermined quality value may be a predetermined value ("0" in the illustrated example) or an invalid value (out-of-range) or the like. Alternatively, the reporting unit 320 may prepare resource pooling for reporting the quality information of the CC or the secondary cell in the active state and adjust a report frequency of the quality information according to the number of CCs or secondary cells serving as the report target. Specifically, as illustrated in FIG. 10, for only the secondary cell in the active state, the reporting unit 320 may report the quality information of the secondary cell to the master base station 100. In other words, the reporting unit 320 reports the quality information of the cell of the secondary base station 200 to the master base station 100 at the report frequencies corresponding to the number of cells serving as the report target.

Further, the reporting unit 320 may limit the CC or cell serving as the report target of the inter-CG UCI to a specific CC or cell. The specific CC or cell may be a cell in which a primary cell or a secondary cell is set or may be designated from a network. Further, whether or not it is necessary to transmit the inter-CG UCI may be dynamically indicated from a network. The indication may be transmitted through, for example, a physical control channel and/or a MAC control signal.

Further, when the transmission power required for the user equipment 300 exceeds the maximum transmission power, the reporting unit 320 distribute the transmission power for the inter-CG UCI (the uplink control information of the secondary cell) and the intra-CG UCI (the uplink control information of the primary cell) based on a predetermined priority. The predetermined priority is classified into (1) intra-CG UCI>inter-CG UCI, (2) intra-CG UCI=inter-CG UCI, or (3) intra-CG UCI<inter-CG UCI.

Further, the reporting unit 320 may multiplex the inter-CG UCI into the intra-CG UCI or may transmit the inter-CG UCI independently. Whether the inter-CG UCI is multiplexed or independently transmitted may be decided according to a capability of the user equipment 300 or a setting from the network. Further, the reporting unit 320 may multiplex the inter-CG UCI into the uplink data information (PUSCH) within in the cell group serving as the report target. A notification of capability information indicating whether or not the inter-CG UCI can be transmitted may be given from the user equipment 300 to the master base station 100. For example, the notification of the capability information may be explicitly given in units of user equipments or units of band combinations or may be given implicitly or indirectly in association with a specific RAT, a frequency, or the like.

In the embodiment, the user equipment 300 has been described in connection with the dual connectivity. However, the user equipment 300 according to the present invention is not limited thereto and can be also applicable to a case in which the base stations 100 and 200 do not perform division transmission to the user equipment 300 or a case in which data is transmitted from only one of the base stations 100 and 200. For example, the user equipment 300 can also be applied to a case in which the base station 100 performs transmission using only the cell, the CC, or the radio resources of the base station 100 without performing the division transmission. According to this case, for example, when the communication quality with the base station 200 is not satisfactory, it is possible to prevent the buffer of the base station 200 from being unnecessarily occupied by accumulate the data instead of transferring the data to the base station 200.

Figure 12:
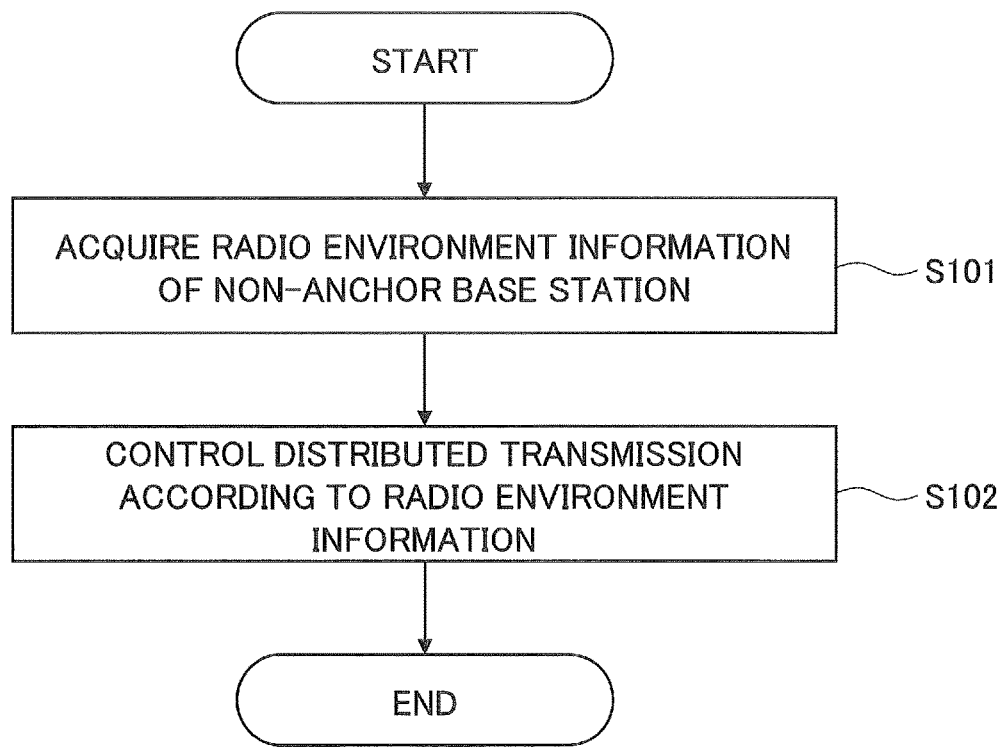
FIG. 12 is a flowchart illustrating a transmission control process in an anchor base station according to an embodiment of the present invention.

Next, a transmission control process performed by the anchor base station according to the embodiment of the present invention is described with reference to FIG. 12. FIG. 12 is a flowchart illustrating the transmission control process performed by the anchor base station according to the embodiment of the present invention. The transmission control process according to the present embodiment is described in connection respect to the dual connectivity, and the master base station 100 functions as an anchor base station, and the secondary base station 200 functions as a non-anchor base station.

As illustrated in FIG. 12, in step S101, the master base station 100 acquires the radio environment information of the secondary base station 200. For example, master base station 100 may acquire the radio environment information from secondary base station 200 or may acquire the radio environment information from the user equipment 300. The radio environment information may be the quality information (for example, the CSI or the like) indicating the communication quality of the radio communication between the secondary base station 200 and the user equipment 300.

In step S102, the master base station 100 controls the distributed transmission according to the radio environment information. In other words, the master base station 100 performs the flow control in the dual connectivity according to the acquired quality information. For example, when the radio communication between the secondary base station 200 and the user equipment 300 is satisfactory, the master base station 100 may increase the data amount to be transferred to the secondary base station 200. On the other hand, when the radio communication between the secondary base station 200 and the user equipment 300 is not satisfactory, the master base station 100 may reduce the data amount to be transferred to the secondary base station 200.

While the dual connectivity is being executed, the master base station 100 repeats steps S101 and S102 and dynamically performs the flow control.

The above-described embodiment is described in connection with the dual connectivity, but the present invention is not limited thereto and can be applied to any distributed transmission scheme in which transmission target packets are divided and transmitted from a plurality of base stations to the user equipment.

The block diagrams used for the descriptions of the above-described embodiment represent blocks on a function-by-function basis. These functional blocks (components) are implemented by any combination of hardware and/or software. Here, a means for implementing each functional block is not particularly limited. Namely, each functional block may be implemented by one device that is physically and/or logically combined, or may be implemented by a plurality of devices that is obtained by directly and/or indirectly (e.g., wired and/or wireless) connecting two or more devices that are physically and/or logically separated.

Figure 13:
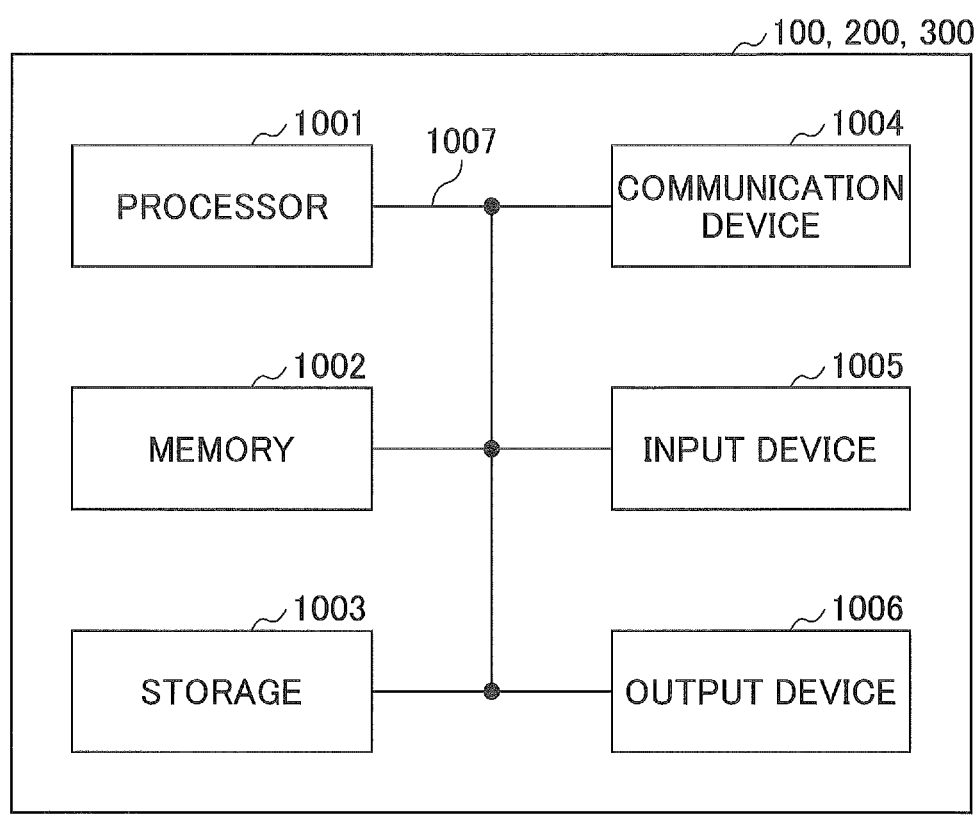
FIG. 13 is a block diagram illustrating hardware configurations of the user equipment and the base station according to an embodiment of the present invention.

For example, the base stations 100, 200, and the user equipment 300 according to the embodiment of the present invention may function as computers for executing a process of the radio communication method of the present invention. FIG. 13 is a block diagram illustrating a hardware configuration of each of the base stations 100, 200 and the user equipment 300 according to the embodiment of the present invention. Each of the above-described base stations 100, 200 and the user equipment 300 may be physically configured as a computer device including a processor 1001, a memory 1002, a storage 1003, a communication device 1004, an input device 500, an output device 1006, a bus 1007, etc.

Note that, in the following description, the term "apparatus" can be read as a circuit, a device, a unit, etc. The hardware configuration of each of the base stations 100, 200 and the user equipment 300 may be configured to include one or more of the respective devices illustrated, or may be configured not to include a part of the devices.

Each function of the base stations 100, 200 and the user equipment 300 is implemented by loading predetermined software (program) on hardware, such as the processor 1001 and the memory 1002, so that the processor 1001 performs computation and controls communication by the communication device 1004, and reading and/or writing of data in the memory 1002 and the storage 1003.

The processor 1001, for example, operates an operating system to control the entire computer. The processor 1001 may be configured with a central processing unit (CPU: Central Processing Unit) including an interface with a peripheral device, a control device, a processing device, a register, etc. For example, each of the above-described components may be implemented by the processor 1001.

Additionally, the processor 1001 reads a program (program code), a software module and data from the storage 1003 and/or the communication device 1004 to the memory 1002, and executes various processes according to these. As the program, a program is used which causes a computer to execute at least a part of the operations described in the above-described embodiment. For example, a process by each component of each of the base stations 100, 200 and the user equipment 300 may be implemented by a control program stored in the memory 1002 and executed by the processor 1001, and another functional block may be similarly implemented. Although it is described that the above-described various processes are executed by a single processor 1001, the above-described various processes may be simultaneously or sequentially executed by two or more processors 1001. The processor 1001 may be implemented with one or more chips. Note that the program may be transmitted from a network via an electric communication line.

The memory 1002 is a computer readable recording medium, and the memory 1002 may be formed of at least one of a read-only memory (ROM), an erasable programmable ROM (EPROM), an electrically erasable programmable ROM (EEPROM), a random access memory (RAM), etc. The memory 1002 may be referred to as a register, a cache, a main memory (main storage device), etc. The memory 1002 can store executable programs (program codes), software modules, etc., that can be executed to implement the radio communication method according to the embodiment of the present invention.

The storage 1003 is a computer readable recording medium, and, for example, the storage 1003 may be formed of at least one of an optical disk such as a CD-ROM (Compact Disc ROM), a hard disk drive, a flexible disk, a magneto-optical disk (for example, a compact disk, a digital versatile disk, a Blu-ray (registered trademark) disk), a smart card, a flash memory (for example, a card, a stick, a key drive), a floppy (registered trademark) disk, a magnetic strip, etc. The storage 1003 may be referred to as an auxiliary storage device. The above-described storage medium may be, for example, a database including the memory 1002 and/or the storage 1003, a server, or any other suitable medium.

The communication device 1004 is hardware (transmission/reception device) for performing communication between computers via a wired and/or wireless network, and, for example, the communication device 1004 is also referred to as a network device, a network controller, a network card, a communication module, etc. For example, each of the above-described component may be implemented by the communication device 1004.

The input device 1005 is an input device (e.g., a keyboard, a mouse, a microphone, a switch, a button, a sensor, etc.) for receiving an input from outside. The output device 1006 is an output device (e.g., display, speaker, LED lamp, etc.) that performs output toward outside. Note that the input device 1005 and the output device 1006 may be integrated (for example, a touch panel).

Furthermore, the devices, such as the processor 1001 and the memory 1002, are connected by a bus 1007 for communicating information. The bus 1007 may be formed of a single bus, or the bus 1007 may be formed of buses that are different among the devices.

Furthermore, each of the base stations 100, 200 and the user equipment 300 may be configured to include hardware, such as a microprocessor, a digital signal processor (DSP: Digital Signal Processor), an ASIC (Application Specific Integrated Circuit), a PLD (Programmable Logic Device), an FPGA (Field Programmable Gate Array), etc., and a part or all of the functional blocks may be implemented by the hardware. For example, the processor 101 may be implemented with at least one of these hardware components.

Notification of information is not limited the aspect/embodiment described in the present specification any may be performed by other methods. For example, notification of information may be performed via physical layer signaling (for example, Downlink Control Information (DCI) or Uplink Control Information (UCI)), higher-layer signaling (for example, RRC signaling, MAC signaling, broadcast information (Master Information Block (MIB), or System Information Block (SIB)), other signals, or by a combination thereof. Moreover, an RRC message may be referred to as the RRC signaling. Furthermore, the RRC message may be an RRC connection setup (RRC Connection Setup) message, a RRC connection reconfiguration (RRC Connection Reconfiguration) message, or the like, for example.

Each aspect/embodiment described in this specification can be applied to long term evolution (LTE), LTE-advanced (LTE-A), SUPER 3G, IMT-Advanced, 4G, 5G, future radio access (FRA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultra-wideband (UWB), Bluetooth (registered trademark), any other systems using an appropriate system and/or next generation systems expanded on the basis of these systems.

Processing procedures, sequences, flowcharts, and the like of each embodiment/modified example described in the specification may be exchanged as long as there is no inconsistency. For example, for the methods described in the specification, the elements of the various steps are presented in an exemplary order and are not limited to a specific order presented.

The specific operations that are described in the specification to be performed by the base station 100, 200 may be performed by their upper nodes in some cases. In a network formed of one or more network nodes including a base station, it is apparent that the various operations performed for communication with the terminal may be performed by the base station and/or a network node other than the base station (e.g., MME or S-GW can be considered, however, not limited to these). In the above description, a case is exemplified in which there is one network node other than the base station. However, it can be a combination of other network nodes (e.g., MME and S-GW).

Information, etc., may be output from a higher layer (or a lower layer) to a lower layer (a higher layer). Input and output may be performed through a plurality of network nodes.

Input and output Information and the like may be stored in a specific location (for example, a memory) and may be managed by a management table. The input and output information and the like may be overwritten, updated, or rewritten. The output information and the like may be erased. The input information and the like may be transmitted to other apparatuses.

Determination may be made by a value (0 or 1) represented by one bit, may be made by a Boolean value (Boolean: true or false), and may be made by comparison of numerical values (comparison with a predetermined value, for example).

Each aspect/embodiment described in this specification may be used alone, may be used in combination, or may be used while being switched during the execution. Furthermore, notification of predetermined information (e.g., notification of "being X") is not limited to notification that is made explicitly, and the notification may be made implicitly (e.g., notification of the predetermined information is not performed).

The present invention is described in detail above. It is apparent to a person ordinarily skilled in the art that the present invention is not limited to the embodiments described in the specification. The present invention can be implemented as modifications and alterations without departing from the gist and scope of the present invention that are determined by the descriptions of the claims. Accordingly, the descriptions of the present specification is for the purpose of illustration and does not have any restrictive meaning to the present invention.

The software should be widely interpreted to mean an instruction, an instruction set, a code, a code segment, a program code, a program, a subprogram, a software module, an application, a software application, a software package, a routine, a subroutine, an object, an executable file, an execution thread, a procedure, a function, etc., regardless of whether the software is referred to as software, firmware, middleware, microcode, hardware description language or other names.

Furthermore, software, instructions, etc., may be transmitted and received via a transmission medium. For example, when the software is transmitted from a website, server, or another remote source using wired technology such as coaxial cable, fiber optic cable, twisted pair and digital subscriber line (DSL) and/or wireless technology such as infrared, radio, and microwave, these wired and/or wireless technologies are included within the definition of the transmission medium.

Information, signals, and the like described in the present specification may be represented using any of various other techniques. For example, data, instructions, commands, information, signals, bits, symbols, chips, and the like mentioned in the entire description may be represented by voltage, current, electromagnetic waves, magnetic field or magnetic particles, optical field or photons, or any combination thereof.

Note that the terms described in this specification and/or the terms necessary for understanding of this specification may be replaced with terms having the same or similar meaning. For example, the channel and/or symbol may be signaling (signal). Furthermore, a signal may be a message. Furthermore, a component carrier (CC) may be referred to as a carrier frequency, a cell, etc.

The terms "system" and "network" as used in this specification are used interchangeably.

Furthermore, the information, parameters, etc., described in this specification may be represented by absolute values, may be represented as relative values from predetermined values, or may be represented by any other corresponding information. For example, the radio resource may be indicated by an index.

The names used for the above-described parameters are not for limiting in any point. Furthermore, mathematical expressions, etc., using these parameters may be different from those explicitly disclosed in this specification. Since the various channels (e.g., PUCCH, PDCCH, etc.) and information elements (e.g., TPC etc.) can be identified by suitable names, the various names assigned to these various channels and information elements are not for limiting in any point.

A base station can accommodate one or more (e.g., three) cells (also referred to as sectors). When the base station accommodates a plurality of cells, the entire coverage area of the base station can be divided into a plurality of smaller areas, and each smaller area may also provide communication services by base station subsystem (e.g., indoor small base station RRH: Remote Radio Head). The term "cell" or "sector" refers to a part or all of the coverage area of a base station and/or base station subsystem that provides communication service in this coverage. Furthermore, the terms "base station," "eNB," "cell," and "sector" may be used interchangeably in this specification. The base station may also be referred to as a fixed station, a NodeB, eNodeB (eNB), an access point, a femtocell, a small cell, etc.

A mobile station may be referred to, by a person ordinarily skilled in the art, as a subscriber station, a mobile unit, a subscriber unit, a wireless unit, a remote unit, a mobile device, a wireless device, a wireless communication device, a remote device, a mobile subscriber stations, an access terminal, a mobile terminal, a wireless terminal, a remote terminal, a handset, a user agent, a mobile client, a client, or it may also be called by some other suitable terms.

The terms "determine (determining)" and "decide (determining)" used in this specification may include various types of operations. For example, "determining" and "deciding" may include deeming that a result of calculating, computing, processing, deriving, investigating, looking up (e.g., search in a table, a database, or another data structure), or ascertaining is determined or decided. Furthermore, "determining" and "deciding" may include, for example, deeming that a result of receiving (e.g., reception of information), transmitting (e.g., transmission of information), input, output, or accessing (e.g., accessing data in memory) is determined or decided. Furthermore, "determining" and "deciding" may include deeming that a result of resolving, selecting, choosing, establishing, or comparing is determined or decided. Namely, "determining" and "deciding" may include deeming that some operation is determined or decided.

The terms "connected," "coupled," or any variation thereof mean any direct or indirect connection or coupling between two or more elements, and may include the presence of one or more intermediate elements between the two elements "connected" or "coupled" to each other. The coupling or connection between the elements may be physical, logical or a combination thereof. Two elements, when used in this specification, can be considered to be mutually "connected" or "coupled by using one more more wires, cables and/or printed electrical connections, and, as some non-limiting and non-inclusive examples, by using electromagnetic energy such as electromagnetic energy with a wavelength in a radio frequency range, a microwave range, and an optical range (both visible and invisible).

The reference signal may be abbreviated as RS (Reference Signal), and may be referred to as a pilot (Pilot) according to applicable standards.

The expression "on the basis of" used in the present specification does not mean "on the basis of only" unless otherwise stated particularly. In other words, the expression "on the basis of" means both "on the basis of only" and "on the basis of at least".

Any reference to elements using names, such as "first" and "second," as used in this specification does not generally limit the amount or order of those elements. These names can be used in this specification as a convenient way to distinguish between two or more elements. Accordingly, the reference to the first and second elements does not imply that only two elements can be adopted, or that the first element must precede the second element in some way.

"Means" in the configuration of each of the above-described devices may be replaced with "part," "circuit," "device," etc.

As long as "include," "including," and variations thereof are used in this specification or the claims, the terms are intended to be inclusive in a manner similar to the term "comprising." Furthermore, the term "or" used in the specification or claims is intended not to be an exclusive OR.

A radio frame may be formed of one or more frames in the time domain. In the time domain, each of the one or more of frames may be referred to as a subframe. A subframe may be formed of one or more slots in the time domain. A slot may be formed of one or more symbols (OFDM symbols, SC-FDMA symbols, etc.) in the time domain. Each of the radio frame, subframe, slot, and symbol represents a time unit for transmitting a signal. The radio frame, subframe, slot, and symbol may be called by respective different names. For example, in LTE system, the base station performs scheduling to allocate radio resources (a frequency bandwidth, transmission power, etc., that can be used by each mobile station) to each mobile station. The minimum time unit of scheduling may be referred to as TTI (Transmission Time Interval). For example, one subframe may be referred to as TTI, a plurality of consecutive subframes may be referred to as TTI, or one slot may be referred to as TTI. A resource block (RB) is a resource allocation unit in the time domain and the frequency domain, and may include one or more consecutive subcarriers in the frequency domain. Additionally, the resource block may include one or more symbols in the time domain, and may have a length of one slot, one subframe, or one TTI. Each of one TTI and one subframe may be formed of one or more resource blocks. The above-described configuration of the radio frame is merely an example, and the number of subframes included in the radio frame, the number of slots included in the subframe, the number of symbols and resource blocks included in the slot, and the number of subcarriers included in the resource block can be variously changed.

The embodiments of the present invention are described in detail above. However, the present invention is not limited to the specific embodiments described above, and various modifications and alterations may be made within the scope of the gist of the present invention described in the claims.

This application is based upon and claims the benefit of priority of Japanese Patent Application No. 2016-078505 filed on Apr. 8, 2016, and the entire contents of Japanese Patent Application No. 2016-078505 are incorporated herein by reference.

LIST OF REFERENCE SYMBOLS 10 radio communication system
100 master base station
200 secondary base station
300 user equipment

The invention claimed is:

1. A base station serving as a distribution source base station in distributed transmission in which transmission target packets are divided and transmitted from a plurality of base stations to a user equipment, the base station comprising:
   a receiver that acquires radio environment information of a distribution destination base station in the distributed transmission; and
   a processor that controls the distributed transmission according to the radio environment information,
   wherein the transmission target packets are divided among the plurality of base stations and transmitted from the plurality of base stations to the user equipment, and
   wherein, at a timing when a cell of the distribution destination base station is in a deactivated state, the receiver receives a predetermined quality value from the user equipment.

2. The base station according to claim 1,
   wherein the processor controls a data amount to be transmitted from the distribution source base station to the distribution destination base station according to the acquired radio environment information.

3. The base station according to claim 1,
   wherein the receiver receives quality information of radio communication between the distribution destination base station and the user equipment from the distribution destination base station.

4. The base station according to claim 1,
   wherein the receiver receives quality information of radio communication between the distribution destination base station and the user equipment from the user equipment.

5. The base station according to claim 4,
   wherein the receiver receives the quality information of the cell of the distribution destination base station from the user equipment at report frequencies corresponding to the number of cells serving as a report target.

6. A user equipment, comprising:
   a processor that measures communication quality of radio communication with a base station of a plurality of base stations;
   a transmitter that reports the measured communication quality to the base station,
   wherein the processor measures the communication quality of the radio communication with the base station that transmits transmission target packets to the user equipment in distributed transmission in which the transmission target packets are divided among the plurality of base stations and transmitted from the plurality of base stations to the user equipment, and
   the transmitter reports a communication quality of a distribution destination base station in the distributed transmission to a distribution source base station,
   wherein, at a timing when a cell of the distribution destination base station is in a deactivated state, the transmitter transmits a predetermined quality value to the distribution source base station.

7. The user equipment according to claim 6,
   wherein the transmitter transmits the quality information of the cell of the distribution destination base station to the distribution source base station at report frequencies corresponding to the number of cells serving as a report target.

8. A transmission control method performed by a distribution source base station in distributed transmission in which transmission target packets are divided and transmitted from a plurality of base stations to a user equipment, the method comprising:
   acquiring radio environment information of a distribution destination base station in the distributed transmission; and
   controlling the distributed transmission according to the radio environment information,
   wherein the transmission target packets are divided among the plurality of base stations and transmitted from the plurality of base stations to the user equipment, and
   wherein, at a timing when a cell of the distribution destination base station is in a deactivated state, the user equipment transmits a predetermined quality value to the distribution source base station.

* * * * *